(12) United States Patent
Cooper et al.

(10) Patent No.: US 9,694,835 B2
(45) Date of Patent: Jul. 4, 2017

(54) DETECTION SYSTEM AND METHOD FOR RAIL VEHICLE

(71) Applicant: General Electric Company, Schenectady, NY (US)

(72) Inventors: Jared Klineman Cooper, Melbourne, FL (US); John William Brand, Flower Mound, TX (US); Robert Francis Bryant, Melbourne, FL (US); Scott William Dulmage, Melbourne, FL (US); David Allen Eldredge, Melbourne, FL (US); Robert James Foy, Melbourne, FL (US); Samuel William Golden, Melbourne, FL (US); John Welsh McElroy, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 14/549,906

(22) Filed: Nov. 21, 2014

(65) Prior Publication Data

US 2015/0076290 A1    Mar. 19, 2015

Related U.S. Application Data

(62) Division of application No. 13/341,196, filed on Dec. 30, 2011, now abandoned.

(51) Int. Cl.
*B61L 23/00* (2006.01)
*G08B 13/00* (2006.01)
(Continued)

(52) U.S. Cl.
CPC .............. *B61L 23/00* (2013.01); *B60R 25/00* (2013.01); *B61L 15/0027* (2013.01); *B61L 15/0072* (2013.01); *G08B 13/00* (2013.01)

(58) Field of Classification Search
CPC . B61L 15/0072; B61L 15/0018; G08B 13/00; G08B 13/18; B60R 25/00; B60R 25/04
(Continued)

(56) References Cited

U.S. PATENT DOCUMENTS

5,382,948 A * 1/1995 Richmond .............. B60R 25/04
                                                     180/287
6,401,015 B1 * 6/2002 Stewart ................. B60T 13/665
                                                       303/7
(Continued)

*Primary Examiner* — Mark Le
(74) *Attorney, Agent, or Firm* — Global Patent Operation; John A. Kramer (57) ABSTRACT

A detection system for a rail vehicle includes a control module, which has a sensor input for receiving a signal from a sensor. The control module is configured to receive the signal and to output information responsive to the signal. In operation, the control module and a sensor are deployed on board the rail vehicle. The sensor is configured to generate the signal responsive to detecting a designated condition on board the rail vehicle. When the condition occurs, the sensor outputs the signal, which is received by the control module. Responsive to the signal, the control module outputs the information, such as communicating information of the signal content to another rail vehicle, or to an off board location. The designated condition may be unauthorized use of a handheld wireless device in a rail vehicle, or intruder entry into an unmanned rail vehicle.

16 Claims, 3 Drawing Sheets (51) Int. Cl.
*B60R 25/00* (2013.01)
*B61L 15/00* (2006.01)

(58) Field of Classification Search
USPC ........ 246/167 R, 187 C; 340/426.19, 426.26,
340/426.29, 429, 438, 539.13, 539.18,
340/539.26, 541, 545.21
See application file for complete search history.

(56) References Cited

U.S. PATENT DOCUMENTS

| | | | | |
|---|---|---|---|---|
| 2005/0219042 | A1* | 10/2005 | Thomson | B60R 25/1004 |
| | | | | 340/426.1 |
| 2007/0256105 | A1* | 11/2007 | Tabe | G08B 13/19697 |
| | | | | 725/78 |
| 2008/0272906 | A1* | 11/2008 | Breed | B60C 11/24 |
| | | | | 340/539.11 |
| 2008/0309762 | A1* | 12/2008 | Howard | G07C 5/0891 |
| | | | | 348/148 |

* cited by examiner

DETECTION SYSTEM AND METHOD FOR RAIL VEHICLE

CROSS-REFERENCE TO RELATED APPLICATIONS

This application is a divisional and claims priority to U.S. application Ser. No. 13/341,196, filed Dec. 30, 2011.

BACKGROUND OF THE INVENTION

Field

Embodiments of the invention relate generally to trains and other rail vehicles. Other embodiments relate to system and methods for detecting conditions on board a rail vehicle, for security or similar purposes.

Discussion of Art

Some rail vehicles, e.g., locomotives, include an operator cab. The cab houses an operator control stand or other operator interface. A locomotive operator controls the locomotive through the control stand. When the locomotive is coupled to other rail vehicles to form a train, the control stand provides the operator control over braking, throttle, and other train functions.

Trains are commonly provided with more than one locomotive. The locomotives may be directly coupled together, thereby forming a locomotive consist. (A consist is a group of vehicles that are mechanically linked to travel together along a route.) Alternatively, the locomotives may be separated by one or more non-powered rail cars (meaning rail vehicles not capable of self propulsion), thereby being remotely positioned along the train. In certain circumstances, locomotive consists may be remotely positioned along the train, with each locomotive consist being separated by at least one non-powered rail car and being remote with respect to the other locomotive consist(s). Remotely positioned locomotive consists along a train provide distributed power, advantageously allowing for heavier trains and/or enhanced train control while transiting terrain with significant elevation changes.

Freight trains (and other trains having remote locomotives) are oftentimes operated by a relatively small crew, e.g., one engineer/operator and one "brakeman." Thus, the remote locomotives may be unmanned and not regularly monitored. This may provide opportunities for unauthorized entrants to gain access to the remote locomotives, at a risk to themselves, the locomotive, and the train itself should the unauthorized entrant attempt to issue commands from the operator interface or otherwise meddle with train equipment.

BRIEF DESCRIPTION OF THE INVENTION

An embodiment of the invention relates to a detection system, e.g., a system for detecting a condition in a rail vehicle. The detection system includes a control module configured to be operably coupled on board a rail vehicle. The control module comprises a device interface, which has a sensor input for receiving a signal from a sensor. The control module is configured to receive the signal and to output information (e.g., communicate the information to another rail vehicle) responsive to the signal.

In operation, the control module and a sensor are deployed on board the rail vehicle. The sensor is configured to generate the signal responsive to detecting a designated condition on board the rail vehicle. When the condition occurs, the sensor outputs the signal, which is received by the control module. Responsive to the signal (and possibly contingent upon the receipt of other signals or the occurrence of other conditions), the control module outputs the information, such as communicating information of the signal content to another rail vehicle, or to an off board location. In embodiments, the designated condition is unauthorized use of a handheld wireless device in a rail vehicle, or intruder entry into an unmanned rail vehicle.

In another embodiment of the detection system, the detection system comprises a control module that is configured to be operably coupled on board a first rail vehicle. The control module comprises a device interface. The device interface includes a first sensor input for receiving a first signal from a first sensor relating to a first occupancy condition of the first rail vehicle. The device interface also includes a second sensor input for receiving a second signal from a second sensor relating to a second occupancy condition of the first rail vehicle. The control module is configured to determine an occupancy status of the first rail vehicle based on the first and second signals, and/or to communicate information of the first and second signals for determination of the occupancy status of the first rail vehicle.

In another embodiment of the detection system, the detection system comprises a control module on board a first rail vehicle. The control module comprises a device interface. The detection system additionally comprises a first sensor and a second sensor on board the first rail vehicle. The first sensor is connected to the device interface and is configured to generate a first signal relating to a first occupancy condition of the first rail vehicle. The second sensor is connected to the device interface and is configured to generate a second signal relating to a second occupancy condition of the first rail vehicle. The control module is configured to receive the first and second signals and to determine an occupancy status of the first rail vehicle based on the first and second signals, and/or to communicate information of the first and second signals for determination of the occupancy status of the first rail vehicle.

In another embodiment, a detection system comprises a control module configured to be operably coupled on board a second rail vehicle. The control module is configured to receive information from a first rail vehicle over a communication channel linking the first rail vehicle and the second rail vehicle. The control module is further configured to generate a control signal based on the information. The information is indicative of intruder entry into the first rail vehicle, or allows the control module to determine the intruder entry into the first rail vehicle.

In another embodiment, a detection system comprises a control module configured to be operably coupled on board a first locomotive. The control module comprises a device interface. The device interface includes a first sensor input for receiving a first signal from a first sensor relating to detecting a first designated condition in an operator cab of the first locomotive. The control module is configured, responsive to receiving the first signal, to communicate information relating to the first signal to a second locomotive or to an off-board location.

In another embodiment, a detection system comprises a control module that is configured to be operably coupled on board a rail vehicle. The control module comprises a device interface. The device interface includes a sensor input for receiving a signal from a sensor. The control module is further configured, responsive to the signal indicating use of a hand-held wireless communication device in the rail vehicle, to: store information relating to the signal on board the rail vehicle; communicate the information to an off-board recipient; and/or activate a device to prevent the wireless communications.

Another embodiment relates to a detection method. The method comprises a step of receiving a first signal from a first sensor on board the first rail vehicle. The method additionally comprises a step of receiving a second signal from a second sensor on board the first rail vehicle. The method additionally comprises a step of communicating an occupancy status that is determined based on the first signal and the second signal, or communicating information of the first signal and the second signal. The occupancy status or information is communicated off-board the first rail vehicle.

BRIEF DESCRIPTION OF THE DRAWINGS

The invention may be best understood by reference to the following description taken in conjunction with the accompanying drawing figures wherein.

DETAILED DESCRIPTION OF THE INVENTION

Embodiments of the invention relate to systems and methods for detecting conditions on board rail vehicles, for security or similar purposes. In one embodiment, a system and method are directed to detecting unauthorized entry into unmanned rail vehicles (e.g., in a train). Here, a system includes a control module and two or more sensors. A rail vehicle is outfitted with the sensors, which are configured to detect different occupancy conditions of the rail vehicle. "Occupancy condition" refers to a state or aspect of the rail vehicle relating to or indicative of the rail vehicle being occupied by a human or other living being. The control module is configured to determine an occupancy status of the rail vehicle (occupied or not occupied) based on signals that are output/generated by the sensors. If the signals of both sensors are indicative of the vehicle being occupied according to different criteria, the control module determines that the vehicle is occupied. Otherwise, not. Thus, whereas reliance on one sensor only might result in an increased potential for "false positives," in embodiments of the invention the rail vehicle is deemed occupied only if both sensors agree according to different criteria.

The occupancy status is determined relative to a first rail vehicle, but in embodiments, the occupancy status is determined at, or communicated to, a second rail vehicle. For example, the first and second rail vehicles may be part of a train or other rail vehicle consist, with the second rail vehicle being a manned, lead vehicle, and the first rail vehicle being located remote in the train. The control module automatically determines the occupancy status, and takes action responsive thereto, e.g., providing notification in the manned, second rail vehicle of unauthorized entry and occupation of remote rail vehicles. Occupancy status-related information may be communicated between the rail vehicles over a distributed power system of the train.

In other embodiments, detection systems are configured for detecting events other than unauthorized entry into remote rail vehicles in a train. In one embodiment, for example, a detection system comprises a control module on board a first rail vehicle and a first sensor connected to the control module. The first sensor is configured to generate a first signal responsive to detecting use of a hand-held wireless device (e.g., cell phone) for wireless communications in an area of the first rail vehicle where using hand-held wireless devices for wireless communications is prohibited. For example, such use may be prohibited in the operator cab of a locomotive. The control module, responsive to the first signal, is configured to: store information relating to the first signal on board the rail vehicle (e.g., when and for how long the wireless device was used); communicate the information to an off-board recipient (e.g., central office); and/or activate a device to prevent the wireless communications.

Figure 1:
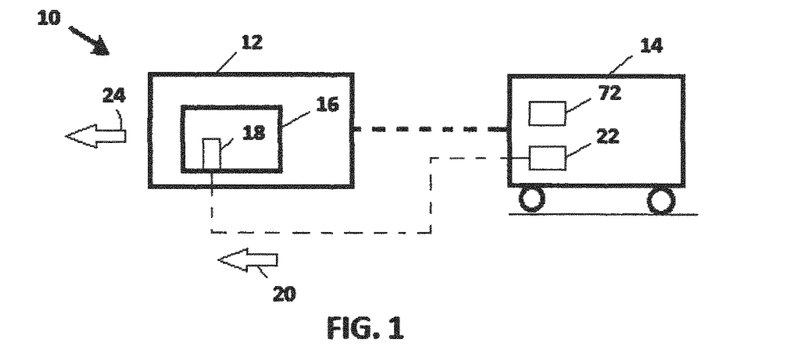
FIGS. 1-6 are schematic diagrams of respective detection systems, according to various embodiments of the invention.

FIG. 1 illustrates an embodiment of a detection system 10, e.g., a system for detecting a condition in a rail vehicle. The detection system 10 includes a first control module 12 configured to be operably coupled on board a first rail vehicle 14. (Examples of how a control module may be configured to be operably coupled on board a rail vehicle include: the control module is configured to operate using electrical power available on a rail vehicle, in regards to available voltage and wattage levels; the control module is ruggedized or otherwise adapted for use in the environment of the rail vehicle; the control module is configured to electrically and/or mechanically interface with one or more systems on board the rail vehicle, in regards to receiving and transmitting information or otherwise; etc.) The control module 12 comprises a device interface 16, which has a sensor input 18 for receiving a signal 20 from a sensor 22. The control module 12 is configured to receive the signal 20 and to output information 24 (e.g., communicate the information to another rail vehicle) responsive to the signal 20.

In operation, the first control module 12 and a sensor 22 are deployed on board the rail vehicle 14. The sensor 22 is configured to generate the signal 20 responsive to detecting a designated condition on board the rail vehicle 14. When the condition occurs, the sensor 22 outputs the signal 20, which is received by the control module 12. Responsive to the signal 20 (and possibly contingent upon the receipt of other signals or the occurrence of other conditions), the control module 12 outputs the information 24, such as communicating information of the signal content to another rail vehicle, or to an off board location, or communicating the information to another on-board system for performing one or more designated actions responsive to the information 24. In embodiments, as mentioned above, the designated condition is unauthorized use of a handheld wireless device in a rail vehicle, or intruder entry into an unmanned rail vehicle.

As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The module(s) shown in the attached figures may represent the hardware that operates based on software or hardwired instructions, the software that directs hardware to perform the operations, or a combination thereof.

The device interface 16 is a module for receiving signals from one or more sensors. The device interface 16 may include electronic and/or mechanical components for receiving signals from sensors. Examples include receptacles for electromechanical attachment of cables that run between the sensors and the control module, electronic components for receiving signals over cables (transceivers, level equalizers, etc.), electronic devices for receiving wireless signals (e.g., transceivers and antenna), a bus connection or other connection for receiving signals from other rail vehicle systems, or the like. The device interface 16 may additionally or alternatively include sets of instructions for controlling electronic equipment to receive and process sensor signals, e.g., a set of instructions that control a processor to receive signals over a communication bus or other communication line of a rail vehicle. The sensor input 18 is a physical and/or logical channel associated with a designated sensor. In an embodiment, the sensor input comprises a receptacle for attachment of a cable that runs between the control module and a single sensor.

Figure 2:
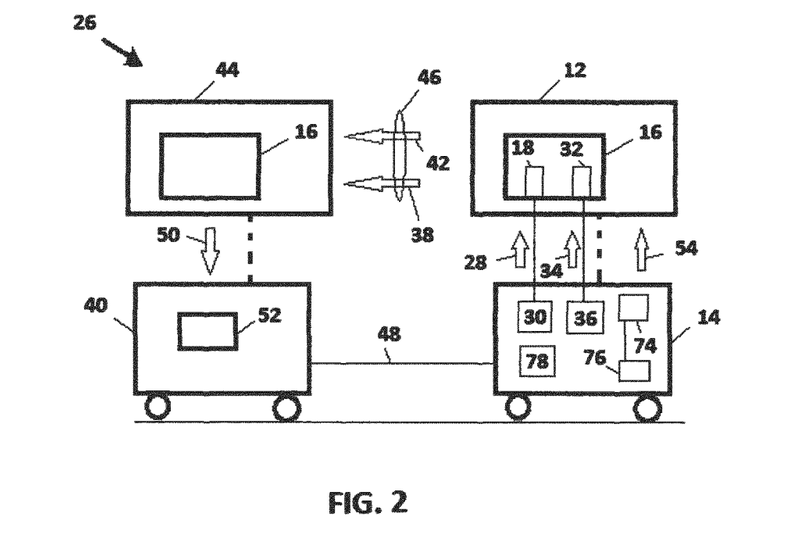

FIG. 2 shows another embodiment of a detection system 26, which is configured for determining and responding to an occupancy status of a rail vehicle. In the detection system 26, the first control module 12 (with device interface 16) is configured to be operably coupled on board the first rail vehicle 14. The device interface 16 includes the first sensor input 18 for receiving a first signal 28 from a first sensor 30 relating to a first occupancy condition of the first rail vehicle 14. The device interface 16 also includes a second sensor input 32 for receiving a second signal 34 from a second sensor 36 relating to a second occupancy condition of the first rail vehicle. The control module 12 is configured to: determine an occupancy status of the first rail vehicle 14 based on the first and second signals 28, 34; and/or communicates signal information 38 of the first and second signals for determination of the occupancy status of the first rail vehicle at another location (e.g., the determination is made at a second rail vehicle).

In operation, the first control module 12 is deployed on the rail vehicle 14, along with the first and second sensors 30, 36. The first and second sensors are communicatively coupled to the control module by way of one or more communication links. A link may comprise a physical connection, such as a wire, connecting the devices and over which one device communicates with another device, e.g., the communication is carried in an electric current encoded with information. Alternatively, a link may comprise a wireless channel connecting the devices, over which one device communicates with another device without a physical connection, using radio waves. The first sensor 30 is configured to detect the first occupancy condition, and to output the first signal 28 responsive to detecting the first occupancy condition. The second sensor 36 is configured to detect the second occupancy condition, and to output the second signal 34 responsive to detecting the second occupancy condition. The control module 12, upon receiving the first and second signals indicative of the first and second sensors detecting the first and second occupancy conditions, respectively, may determine an occupancy status (occupied or not occupied) of the first rail vehicle 14 based on the first and second signals. If the first rail vehicle is occupied by a living being, the control module performs one or more designated actions. As discussed in more detail below, these may include activating a camera on the first rail vehicle, activating one or more intruder countermeasures (e.g., disabling operator interfaces on board the first rail vehicle), and/or communicating the occupancy status 42 to the second rail vehicle 40 or elsewhere. Alternatively, the control module may communicate the signal information 38 of the first and second signals to the second rail vehicle 40, for determination of the occupancy status of the first rail vehicle at the second rail vehicle 40.

The detection system 26 may further comprise a second control module 44 that is configured to be operably coupled on board the second rail vehicle 40. The second control module 44 is configured to receive information 46 from the first rail vehicle 14 (e.g., from the first control module 12) over a communication channel 48 linking the first rail vehicle and the second rail vehicle. The information 46 communicated from the first rail vehicle and received by the second control module 44 on board the second rail vehicle may include the occupancy status 42, or the signal information 38 of the sensor signals 28, 34. If the system 26 is configured for the latter (for the signal information 38 to be communicated from the first rail vehicle to the second rail vehicle), the second control module 44 will be configured to determine the occupancy status of the first rail vehicle based on the signal information 38. In either case (that is, if either the second control module determines the occupancy status or receives the occupancy status), the second control module 44 is further configured to generate one or more control signals 50 based on the information 46. For example, the second control module 44 may be configured to generate the control signal(s) 50 if the information 46 is indicative of intruder entry into the first rail vehicle (e.g., occupancy status indicates the first rail vehicle is occupied when it is supposed to be unmanned). The system may be configured for the control signal(s) 50 to control an operator interface 52 on board the second rail vehicle 40, to alert an operator of the second rail vehicle. The system may be configured, alternatively or additionally, for the control signal(s) to serve some other control purpose, such as initiating communication of one or more control signals to the first rail vehicle (e.g., for initiating intruder countermeasures, for activating a camera, or the like), or initiating communication of signals off board the vehicles (e.g., an alert to a central office).

In an embodiment, the detection system is configured for deployment in a train or other rail vehicle consist. Here, the first rail vehicle 14 is directly or indirectly mechanically coupled with the second rail vehicle 40, e.g., the second rail vehicle may be spaced apart from the first rail vehicle by plural non-powered rail cars, such as freight cars. The first control module 12 is operably coupled on board the first rail vehicle 14, and the second control module 44 is operably coupled on board the second rail vehicle 40. The first and second sensors 30, 36 are positioned in the first rail vehicle 14, and are operably coupled to the device interface 16 of the first control module 12. The sensors 30, 36 output the sensor signals 28, 34, which are received by the first control module 12. The signals relate to first and second occupancy conditions of the first rail vehicle. For example, the sensors may be configured to generate the signals only upon detecting the occupancy conditions, or the sensors may generate signals continuously but with the content of the signal indicating whether the occupancy condition is satisfied (e.g., a first designated voltage level indicating the occupancy condition is satisfied, and a second designated voltage level indicating the occupancy condition is not satisfied). The first control module 12 determines the occupancy status of the first vehicle (occupied or not occupied) based on the signals, and may communicate the occupancy status 42 to the second control module 44 on the second rail vehicle. The first control module may be configured to communicate the occupancy status 42 continuously while the first control module is operating and receives the signals, or it may be configured to communicate the occupancy status periodically, or it may be configured to communicate the occupancy status only if the occupancy status meets one or more designated criteria, such as being indicative of a living being present in the first rail vehicle (i.e., occupancy status=occupied). The first control module may be configured to determine the occupancy status based on comparing the signals 28, 34, for example: the first control module may determine the occupancy status as occupied if both signals 28, 34 are indicative of their respective occupancy conditions being satisfied, that is, if both signals indicate a living being present in the rail vehicle; and the first control module may determine the occupancy status as unoccupied, or indeterminate, if either of the two signals is not indicative of its respective occupancy condition being satisfied. Alternatively, the first control module 12 may be configured to communicate signal information 38 of the signals 28, 34 to the second control module 44, for the second control module to make a determination of occupancy status. The second control module 44 may then generate a control signal 50 based on the occupancy status, e.g., for alerting an operator.

The detection system may be used in situations where the first rail vehicle 14 is part of a train or other rail vehicle consist and is controlled for unmanned operation, e.g., as part of a distributed power control system where a manned, lead locomotive or other rail vehicle in a train (the second rail vehicle 40) controls one or more unmanned, remote locomotives or other rail vehicles in the train (the first rail vehicle 14). Here, the detection system communicates the occupancy status of the unmanned, first rail vehicle to the manned, second rail vehicle (or information enabling the second rail vehicle to determine the occupancy status), and alerts the operator(s) of the second rail vehicle (or performs one or more other designated functions) if the unmanned, first rail vehicle is occupied, e.g., if an intruder has illicitly gained entry into the first rail vehicle. The detection system may be configured such that the first control module 12 is activated, or is only activated, when the first rail vehicle is controlled to a mode of unmanned operation, e.g., the first rail vehicle is controlled to operate as a remote unit in a distributed power control system. For example, the first control module 12 may be configured to receive a signal 54 (relative to the two sensor signals 28, 34, the signal 54 is a third signal) indicative of unmanned operation of the first rail vehicle, and to enter a mode of operation of the control module 12 for determining the occupancy status 42 or communicating the information 38 responsive to the signal 54. The signal 54 may originate from a rail vehicle control system of the first rail vehicle, or it may be a signal generated responsive to a manual control input, or it may be a signal from a distributed power system of the rail vehicle(s).

Figure 3:
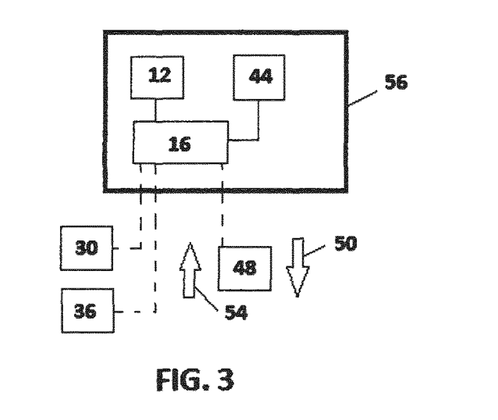

In embodiments of the detection system, with reference to FIG. 3, the functions of the control modules 12, 44 as described herein are integrated into a single control module 56. (The single control module 56 may be referred to as a master control module.) The control module 56 at least functionally includes the second control module 44, and also at least functionally includes the first control module 12 with the device interface 16 (for receiving sensor signals). The device interface 16 may be configured to provide a connection to the communication channel 48, or the control module 56 may have a separate sub-unit for such a purpose. The control module 56 is configured for at least two modes of operation. In a first mode of operation, the control module 56 functions as the first control module 12 described herein, for receiving and processing sensor signals. In a second mode of operation, the control module 56 functions as the second control module 44 described herein, for receiving information from a remote or other, different rail vehicle over the communication channel 48 and generating control signals 50 responsively. (Alternatively, the control module 56 may not have specific modes of operation, that is, all functions are generally available, but rather the specific functions it performs are automatically selected based on what inputs the control module 56 receives and/or based on what other systems the control module 56 is connected to.) The control module 56 may be configured for the mode of operation, and/or the performed functions, to be selected based on a signal 54, received by the control module 56, which is indicative of a current mode of operation of the rail vehicle in which the control module 56 is deployed, e.g., a manned mode of operation or an unmanned mode of operation. The mode of operation, and/or the performed functions, may also be pre-selected based on a manually set configuration of the control module 56, such as a switch or jumper, provided as part of the control module, which enables selecting of the particular mode of operation.

In a transportation system, all rail vehicles in the transportation system, or some plurality of rail vehicles in the transportation system, may be outfitted with the master control modules 56 and sensors 30, 36. According to one aspect, when two or more such rail vehicles are included in a train or other rail vehicle consist, the control module 56 on one of the rail vehicles, such as a lead rail vehicle, is controlled to the mode of operation of the second control module, and the control modules 56 on the other rail vehicles, such as remote rail vehicles that are designated for unmanned operation in the rail vehicle consist, are controlled to the mode of operation of the first control module. In operation, if the two sensors on any one of the remote rail vehicles generate sensor signals indicative of respective occupancy conditions being satisfied (e.g., occupancy status=occupied), then information of this (e.g., the occupancy status, or signal information of the sensor signals) is communicated to the lead rail vehicle, for display of an operator alarm or otherwise. Thereby, operators of a lead rail vehicle may be informed of intruder entry into remote, unmanned rail vehicles of a train or other vehicle consist. In embodiments, the control modules 56 are deployed on locomotives in a transportation system.

Turning now to further detail regarding embodiments of the sensors in the detection system, the sensors 30, 36 are operative to detect first and second different occupancy conditions of the first rail vehicle 14. The occupancy conditions may comprise different indicia that a living being has entered and/or is within the first rail vehicle 14. As used herein, "living being" means a human or animal. As also used herein, "entry" into the rail vehicle means that an opening/entryway (e.g., secured by a door, hatch, window, or the like) has been enlarged or otherwise accessed such that a living being may enter into an interior of the rail vehicle.

In an embodiment, at least one of the sensors 30, 36 comprises a mechanically active sensor operatively coupled to an entryway of the rail vehicle. For example, in one embodiment, one of the sensors 30, 36 comprises a plunger assembly integrated into door frame/door assembly or window frame/window assembly. The plunger normally assumes an extended position, with a spring-like resilient member maintaining the plunger at the extended position and outside of a plunger base. The plunger assembly is integrated into an electric circuit such that the door or window, in its closed position, causes the plunger to be received within the plunger assembly base, in a retracted position of the plunger, thereby making the sensor circuit electrically open. When the door or window assumes its open position, the plunger assumes its extended position, thereby making the sensor circuit electrically closed. The closed sensor circuit of the sensor 30, 36 provides a signal 28, 34 to the device interface 16 indicating that the door or window has assumed its open position. In this example, the occupancy condition detected by the sensor is an access (e.g., door or window) to a rail vehicle entryway being opened, which may be indicative of a living being having entered the rail vehicle or having attempted to do so.

In another embodiment, at least one of the sensors 30, 36 comprises a mechanically passive sensor operatively coupled to an entryway of the rail vehicle. For example, in another embodiment, the sensor comprises a capacitance gauge integrated into a door frame/door assembly or window frame/window assembly. The capacitance gauge comprises two plates, a first plate being attached to the door frame or window frame and a second plate being attached to the door or window, respectively. The sensor circuit is integrated with the plates such that the distance between the plates creates an electromagnetic field, with the strength of the field correlated to the distance between the plates. Upon opening of the entryway, the field strength changes, and the sensor relates the change in field strength as a door or window open signal to the device interface 16, thereby communicating entry or attempted entry into the rail vehicle.

The detection system may comprise a combination of difference sensor types. For example, at least one of the sensors 30, 36 may be a motion detector positioned within the cab or other compartment/interior of the rail vehicle. The motion detector is configured to detect movement within the interior. If movement is detected, the motion detector outputs a signal indicative of such, which is communicated to the device interface. Thereby, the signal relates to an occupancy condition comprising the interior of the rail vehicle possibly being occupied by a living being. Alternatively or additionally, at least one of the sensors 30, 36 may be a temperature (heat) sensor configured to recognize a departure from a recorded compartment baseline temperature (e.g., a raise in temperature) indicative of occupancy of the rail vehicle by a living being. Upon detecting such, the temperature sensor outputs a sensor signal to the device interface. Alternatively or additionally, at least one of the sensors 30, 36 may be operative to detect an unexpected use of a rail vehicle control device (not shown) within the rail vehicle, such as a movement of a throttle handle or receipt of a command at an operator display (not shown) positioned within the rail vehicle. ("Unexpected" use means a use meeting one or more designated criteria for generating a sensor signal indicative of an occupancy condition being satisfied, such as manual manipulation of a control device in a rail vehicle that is currently designated for unmanned operation.) Still further, alternatively or additionally, at least one of the sensors may be a gas constituent sensor positioned within the interior of the rail vehicle and operative to detect gases or gas concentrations, such as levels of oxygen, carbon monoxide, carbon dioxide, etc. indicative of occupancy of the rail vehicle by a living being. Still further, alternatively or additionally, at least one of the sensors may comprise a pressure sensor configured to detect a pressure/weight/force applied to an object in the rail vehicle. Such a pressure sensor may be positioned, for example, in a seat within the rail vehicle, in a step at a doorway threshold, in a floor of the rail vehicle, or between a cab and frame of the rail vehicle (e.g., increased weight in the cab actuates the sensor). In operation, the pressure sensor outputs a sensor signal, indicative of an occupancy condition being satisfied (e.g., living being within the rail vehicle), upon sensing a pressure, weight, force, etc. applied to the sensor, which is communicated to the device interface. The pressure sensor may be configured to output a signal (indicative of the occupancy condition being satisfied) only if the pressure, force, weight, etc. applied to the sensor is above a designated threshold that reflects a minimum-sized living being of interest.

Although two sensors are shown in the embodiment of FIG. 2, the detection system may include, on a per rail vehicle basis, more than two sensors (e.g., two sensors for detecting occupancy conditions and one for detecting unauthorized use of a handheld wireless communication device). In other embodiments of the detection system, a rail vehicle has only one sensor (e.g., a sensor for detecting unauthorized use of a handheld wireless communication device).

In an embodiment, the first sensor 30 and the second sensor 36 are configured to perform different detection operations, such that the signals output by the sensors relate to different occupancy conditions. In one example, the first sensor 30 is configured to detect the opening of a vehicle entryway, and the second sensor 36 is configured to detect the potential presence of a living being inside the rail vehicle. Upon such occurrences, the first sensor 30 outputs a first sensor signal 28, and the second sensor 36 outputs a second sensor signal 34. The first sensor signal relates to a first occupancy condition (living being may have entered rail vehicle), and the second sensor signal relates to a second occupancy condition (living being inside rail vehicle). In another example, both sensors 30, 36 are configured to detect the potential presence of a living being inside the rail vehicle, with the occupancy condition associated with one sensor comprising detection according to one criterion, and the occupancy condition associated with the other sensor comprising detection according to another, different criterion (e.g., the condition for assessing occupancy of one sensor is movement, and the other is temperature increase). Such measurements relating to different occupancy conditions may advantageously provide for redundancy in detecting potential occupancy of the rail vehicle. For example, in one embodiment, a door or window open signal without a corresponding signal of presence of a living being within the rail vehicle would not result in a determination that the rail vehicle is occupied, and resultant generation of a control signal. Instead, such a combination of sensor signals might be deemed as indicating an unsecured entryway or the like, for example. (In which case the system may be configured to take no control action, or take a different action.)

In embodiments, one or more of the control modules 12, 44, 56 includes, and/or is configured to interface with, and/or is implemented on or in conjunction with, a controller and a communications interface. For example, with reference to FIG. 4, in an embodiment, the master control module 56 (also applicable to embodiments of the modules 12, 44) comprises a device interface 16 and a set of instructions 58 stored in a tangible and non-transitory computer readable storage medium. The device interface 16 is configured for receiving sensor signals as described herein (e.g., the device interface may include ports or other receptacles or other connection points for connecting sensors). The device interface 16 is connected to a system interface 60 on board the rail vehicle, which provides physical and logical communication pathways between a controller 62 on board the rail vehicle and one or more sub-systems on board the rail vehicle, such as a communication sub-system 64. The storage medium is accessible by the controller 62, and in one mode of operation or otherwise, the controller 62 accesses and executes the instructions 58. The instructions 58 cause the controller 62 to control execution of one or more of the module functions described herein, for example, to receive sensor signals at the system interface 60 through the device interface 16, and process the signals.

Figure 4:
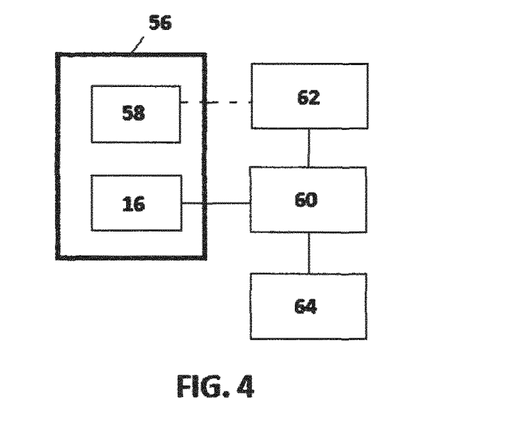

The controller 62 may include a microprocessor, microcontroller, programmable logic controller (PLC), reduced instruction set computer (RISC), a programmable gate array (PGA), application specific integrated circuit (AISC), and/or any other programmable circuit. The storage medium may comprise a hard disk, a solid-state drive, a diskette, a flash drive, a compact drive, a digital video disk, random access memory (RAM), read-only memory (ROM), or the like. In an embodiment, the controller 62 comprises an integrated on-board computer (OBC) and communications management unit (CMU) for applications hosting. One such OBC/CMU is available under the trade name of LOCOCOMM™ by GE Transportation of Erie, Pa., which provides capability for software change/upgrade for the addition and/or modification of the detection system described herein.

The communication unit 64 provides communications connectivity between rail vehicles, and/or between rail vehicles and off-board locations. For example, the communication unit 64 may establish the communication channel 48 described herein. The communication unit 64 may be specially provided as part of the detection system, or it may be an existing communication unit. One example of a suitable communication unit is a low bandwidth trainline modem for wired communications between vehicles in consist (e.g., locomotives coupled together in a locomotive consist). Communications of the detection system could be carried out with such equipment by passing signals through an existing 27-wire jumper cable (MU cable) between the first and second rail vehicles, with occupancy status or signal information relayed from the first rail vehicle to the second rail vehicle through at least one of the spare wires provided in the jumper, e.g., wire number 11, 14, 18, 19, or 27 as provided in a standard jumper. Alternatively or additionally, the communication unit could be part of a high bandwidth intra-consist communication systems (see U.S. Application Publication No. US2011-0099413, dated Apr. 28, 2011), or the detection system could use communication units that are part of a wired or wireless distributed power system for controlling remote rail vehicles in a consist from a lead rail vehicle. An example of the latter is the LOCOTROL® distributed power system available from GE Transportation.

Figure 5:
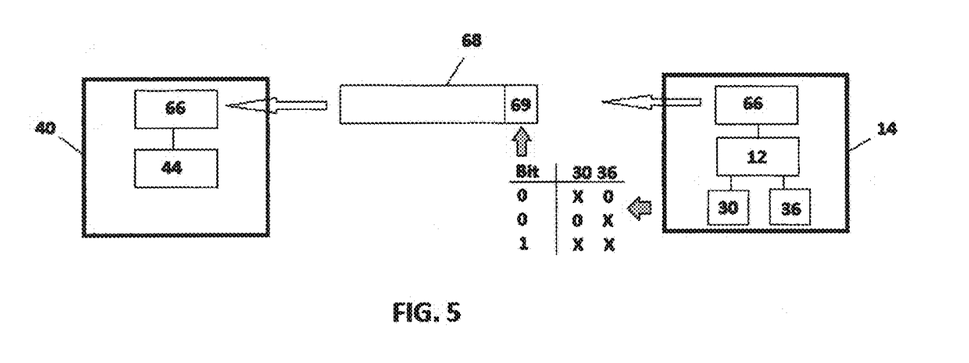

In an embodiment, for communication of the information 46 (occupancy status 42 and/or signal information 38) between rail vehicles in a train or other consist, the control module 12 is configured to incorporate the information into distributed power messages that are communicated over a distributed power system of the consist. With reference to FIG. 5, the first and second rail vehicles 14, 40 each include a distributed power "box" or other module 66, as part of the LOCOTROL® distributed power system noted above or other distributed power system. The distributed power module 66 may be existing equipment, and may include one or more of: a communication unit for wired or wireless communications between rail vehicles; an interface with an on-board control system of the rail vehicle; and/or a distributed power control unit (comprising software and/or hardware) that works in conjunction with the communication unit and interface to carry out distributed power operations. For example, in a lead unit (rail vehicle designated for master control of distributed power operations), the distributed power module 66 may generate commands, which are transmitted to remote units (rail vehicles designated, in effect, as distributed power slaves). The commands are generated based on a current and/or desired operational state of the lead unit and/or consist generally. The distributed power modules 66 of the remote units are configured to receive the commands and communicate with their respective on-board control systems for executing the commands, e.g., controlling a notch level or other throttle level. The commands may be communicated between rail vehicles as distributed power messages 68. The distributed power system may be otherwise configured for the communication of distributed power messages 68. For example, remote units may periodically communicate with the lead unit to convey status information, alarms or alerts relating to distributed power operations, or the like. Each message comprises a plurality of bits encoded in an electrical signal. For example, each message may be one byte (eight bits) in length. The content of the messages is dictated by a pre-established distributed power communication protocol.

The control module 12 is operably interfaced with the distributed power module 66 on board the first rail vehicle 14. (The control module may be operably interfaced by way of: an intermediary connection with the vehicle's on-board control system; a direct connection with a communication interface of the distributed power module; or the like.) The control module 12 is configured to control or otherwise communicate with the distributed power module 66 to incorporate the information into the distributed power messages 68. For example, if the distributed power communication protocol is such that the messages 68 have a spare or open bit 69, the control module 12 may communicate the occupancy status using this spare bit 69, e.g., "0" designates that the occupancy status is unoccupied, and "1" designates that the occupancy status is occupied (or vice versa). This is shown schematically in FIG. 5, where "X" and "O" in the table, corresponding to sensor outputs of the sensors 30, 36, correspond to the occupancy condition being satisfied (X) and the occupancy condition not being satisfied (O). Thus, in this example, if the occupancy conditions of both sensors are satisfied, a "1" is communicated in the spare bit 69, indicating that the rail vehicle is occupied. In the second rail vehicle 40, the second control module 44 is configured to review the bit 69, and to take action as described herein if the bit 69 is indicative of an occupied status.

Figure 6:
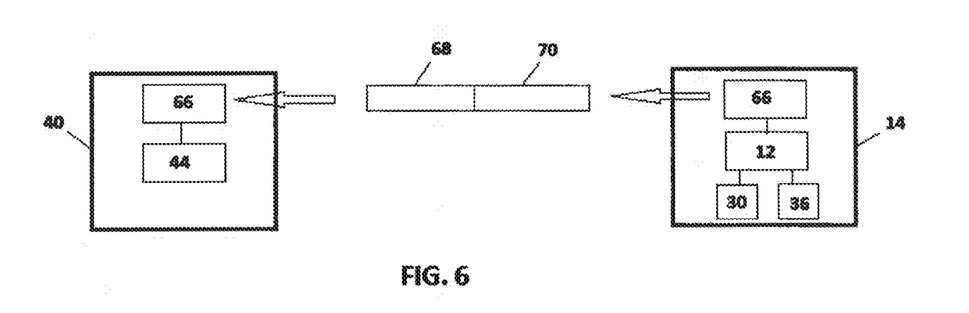

In another embodiment, with reference to FIG. 6, the control modules 12, 44 are configured to otherwise communicate the information 46 in conjunction with distributed power messages. For example, a second byte 70 may be appended to the messages 68, with the byte 70 containing the information 46 in a designated encoded format. The distributed power system may be modified, if needed, to account for the extra presence of the byte 70. Alternatively, the byte 70 may be added to and stripped from the communications before they are substantively processed by the distributed power system, in a data tunneling-like operation.

As noted above, in embodiments of the system 10, 26, one or more of the control modules 12, 44 are configured to perform one or more designated actions upon the occurrence of a designated condition on board a rail vehicle. In the case of the system 10 of FIG. 1, the information 24 may be communicated to another on-board system 72 of the rail vehicle 14, which acts responsively to the information 24. For example, if the sensor 22 is positioned in a designated area where handheld wireless device use is prohibited, for detecting such use, then the information 24 may activate a device 72 for blocking use of the handheld wireless device. In the case of system 26 of FIG. 2, for detecting intruder occupancy (designated condition=occupied), the designated actions may include activating a camera 74 on the first rail vehicle. (The control module 12 may be configured to activate the camera 74 on the first rail vehicle 14, or the control module 44 may be configured to communicate back to the first rail vehicle 14 from the second rail vehicle 40 for controlling the camera 74 on board the first rail vehicle.) The camera 74 may be positioned in the area where intruder detection is carried out (e.g., in the operator cab), for: (i) recording activity in the area; and/or (ii) communicating picture information (video and/or pictures) to the second rail vehicle or to an off-board location. The picture information may be displayed on the operator interface 52 of the second rail vehicle 40, for an operator to verify the presence (or not) of an intruder. The camera 74 may capture still pictures or video (or both), and may record such picture information in memory accessible by the control module(s) 12, 44. The picture information may be time-stamped, associated with information from other rail vehicle devices, and/or it may be redundantly stored on a rail vehicle event recorder 76 for subsequent retrieval.

In another embodiment, a control module 12, 44 is configured, responsive to the occurrence of a designated condition (e.g., plural sensors outputting signals indicative of respective occupancy conditions being satisfied), to activate one or more intruder countermeasures. For example, the first rail vehicle 14 may have an operator interface 78 (e.g., operator controls), and the control module 12, 44 may be configured, responsive to detection of an intruder in the first rail vehicle (i.e., occupancy status=occupied), to disable the operator interface, thereby preventing the intruder from using the operator interface.

According to one aspect of the invention, upon the system 10, 26 detecting a designated condition, one or more actions of the system are latched/held until an operator (or system element) clears the designated condition. For example, in the case of the system 26 in FIG. 2, if the sensors 30, 36 both output signals of their respective occupancy conditions being satisfied, then the control module 12 may latch communication of the information 46 to this effect until a clearing signal is received. That is, the control module 12 continuously transmits the information 46 (e.g., information indicative of intruder entry), or periodically re-transmits the information 46, as the case may be, until a clearing signal is received from the second control module 44. This prevents instances where the control module 44 may "miss" the information 46 due to it being received only once and during a time period when the control module 44 is unable to process the information.

Figure 7:
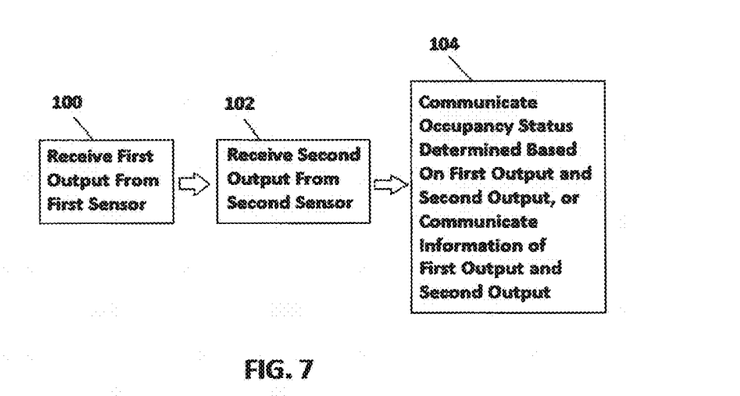
FIG. 7 is a flowchart of a detection method, according to an embodiment of the invention.

FIG. 7 is a flow chart illustrating a detection method, according to an embodiment of the invention. The method comprises, at step 100, receiving a first output from a first sensor on board a first rail vehicle. At step 102, a second output is received from a second sensor on board the first rail vehicle. The method further comprises, at step 104, communicating an occupancy status determined based on the first output and the second output, or communicating information of the first output and the second output. The occupancy status or information is communicated off-board the first rail vehicle.

In another embodiment of the method, the occupancy status or information is communicated to a second rail vehicle. The occupancy status or the information may be communicated to the second rail vehicle over a communication link of a distributed power system of the first and second rail vehicles.

In another embodiment, the method further comprises determining the occupancy status as indicative of intruder entry into the first rail vehicle if the first output is indicative of an entry of the first rail vehicle being opened and if the second output is indicative of a living being present in an interior of the first rail vehicle.

In another embodiment of the method, the first output is received from an entry ajar sensor, and the second output is received from one of a motion detection sensor in an interior of the rail vehicle, a heat sensor in the interior, an operator control usage sensor in the interior, a gas constituent sensor in the interior, or a pressure sensor in the interior.

Figure 8:
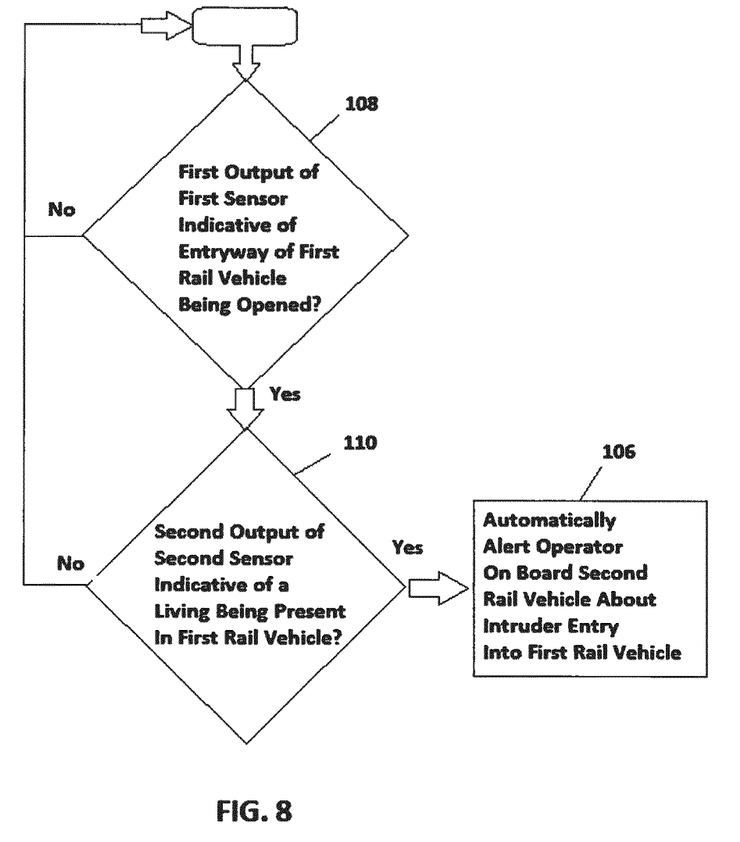
FIG. 8 is a flowchart of a detection method, according to another embodiment of the invention.

With reference to FIG. 8, another embodiment of the detection method comprises automatically alerting (step 106) an operator on board a second rail vehicle of intruder entry into a first rail vehicle if a first output of a first sensor on board the first rail vehicle is indicative of an entry of the first rail vehicle being opened (step 108) and if a second output of a second sensor on board the first rail vehicle is indicative of a living being present in an interior of the first rail vehicle (step 110). In another embodiment of the detection method, the operator is alerted only if the first output and the second output occur within a designated time threshold of one another. In another embodiment of the method, the method further comprises, subsequent to alerting the operator, generating a control signal for initiating deployment of a killer robot in the interior of the first rail vehicle.

The sensors 22, 30, 36 may be configured to operate in various manners, depending on the configuration that is desired for implementation. The sensors may generate continuous outputs, periodic outputs, or may only convey information when polled by a control module. Thus, terms such as "receiving a signal" and "configured to generate a signal" include embodiments where a sensor is communicated with to obtain information from the sensor.

An embodiment relates to a detection system. The system comprises a control module configured to be operably coupled on board a first rail vehicle. The control module comprising a device interface. The device interface includes a first sensor input for receiving a first signal from a first sensor relating to a first occupancy condition of the first rail vehicle. The device interface includes a second sensor input for receiving a second signal from a second sensor relating to a second occupancy condition of the first rail vehicle. The control module is configured to at least one of: determine an occupancy status of the first rail vehicle based on the first and second signals, or communicate information of the first and second signals for determination of the occupancy status of the first rail vehicle.

In another embodiment of the detection system, the control module is configured to receive a third signal indicative of unmanned operation of the first rail vehicle, and to enter a mode of operation of the control module for determining the occupancy status or communicating the information responsive to the third signal.

In another embodiment of the detection system, the control module is configured to at least one of: communicate the occupancy status to a second rail vehicle; or communicate the information of the first and second signals to the second rail vehicle, for determination of the occupancy status of the first rail vehicle at the second rail vehicle.

In another embodiment of the detection system, the control module is configured to communicate the occupancy status or the information to the second rail vehicle over a communication channel of a distributed power system of the first and second rail vehicles.

In another embodiment of the detection system, the control module is configured to: communicate a bit incorporating the first signal and the second signal reporting the occupancy status of the first rail vehicle to the second rail vehicle; or communicate a byte to the second rail vehicle, the byte incorporating the information of the first signal and the second signal.

In another embodiment of the detection system, the control module is configured to communicate the occupancy status or the information responsive to the first signal indicating detection of an entryway of the first rail vehicle having been opened and the second signal indicating detection of a living being present in an interior of the first rail vehicle.

In another embodiment of the detection system, the control module is configured for operable coupling with an operator interface in the first rail vehicle. The control module is further configured to detect a use of the operator interface that meets one or more designated criteria. The control module is further configured to determine the occupancy status or communicate the information based on the use.

In another embodiment of the detection system, the control module is configured, responsive to receiving the first and second signals, to generate a control signal for activating a camera in an interior of the first rail vehicle, and to receive picture information from the camera.

In another embodiment of the detection system, the control module is configured for operable coupling with an operator interface in the first rail vehicle. The control module is further configured to disable the operator interface responsive to the occupancy status.

Another embodiment of a detection system comprises a control module on board a first rail vehicle. The control module comprises a device interface. The system further comprises a first sensor connected to the device interface and configured to generate a first signal relating to a first occupancy condition of the first rail vehicle, and a second sensor connected to the device interface and configured to generate a second signal relating to a second occupancy condition of the first rail vehicle. The control module is configured to receive the first and second signals and to at least one of: determine an occupancy status of the first rail vehicle based on the first and second signals, and/or communicate information of the first and second signals for determination of the occupancy status of the first rail vehicle.

In another embodiment of the detection system, the control module is configured to at least one of: communicate the occupancy status to a second rail vehicle; or communicate the information of the first and second signals to the second rail vehicle, for determination of the occupancy status of the first rail vehicle at the second rail vehicle.

In another embodiment of the detection system, the control module is configured to communicate the occupancy status or the information to the second rail vehicle over a communication link of a distributed power system of the first and second rail vehicles.

In another embodiment of the detection system, the control module is configured to: communicate a bit incorporating the first signal and the second signal reporting the occupancy status of the first rail vehicle to the second rail vehicle; or communicate a byte to the second rail vehicle, the byte incorporating the information of the first signal and the second signal.

In another embodiment of the detection system, the first sensor is configured to generate the first signal responsive to an entryway of the first rail vehicle being opened, and the second sensor is configured to generate the second signal responsive to detecting presence of a living being in an interior of the first rail vehicle.

In another embodiment of the detection system, the first sensor is an entry ajar sensor operatively coupled to the entryway of the first rail vehicle, and the second sensor is one of a motion detection sensor in an interior of the first rail vehicle, a heat sensor in the interior, an operator control usage sensor in the interior, a gas constituent sensor in the interior, or a pressure sensor in the interior.

In another embodiment of the detection system, the system further comprises a camera operably coupled to the control module and configured to capture picture information of an interior of the first rail vehicle. The control module is configured to activate the camera to capture the picture information based on the occupancy status. In another embodiment of the detection system, the camera and/or the control module is configured to store the picture information and to time stamp the picture information. In another embodiment of the detection system, the camera and/or the control module is configured to control redundantly storing the picture information on a rail vehicle event recorder.

In another embodiment of the detection system, the control module is configured to disable an operator interface of the first rail vehicle responsive to the occupancy status.

In another embodiment of the detection system, the control module is configured to enter a mode of operation of the control module for determining the occupancy or communicating the information responsive to the first rail vehicle being controlled for unmanned operation.

Another embodiment relates to a detection system. The system comprises a control module configured to be operably coupled on board a second rail vehicle. The control module is configured to: receive information from a first rail vehicle over a communication channel linking the first rail vehicle and the second rail vehicle; and generate a control signal based on the information, wherein the information is indicative of intruder entry into the first rail vehicle or allows the control module to determine the intruder entry into the first rail vehicle.

In another embodiment of the detection system, the system further comprises an operator interface. The control module is configured to communicate the control signal to the operator interface, and the operator interface is configured to display an operator alert of the intruder entry responsive to the control signal.

In another embodiment of the detection system, the communication channel is a communication channel of a distributed power system of the first and second rail vehicles.

Another embodiment relates to a detection system. The system comprises a control module configured to be operably coupled on board a first locomotive. The control module comprising a device interface. The device interface includes a first sensor input for receiving a first signal from a first sensor relating to detecting a first designated condition in an operator cab of the first locomotive. The control module is configured, responsive to receiving the first signal, to communicate information relating to the first signal to a second locomotive or to an off-board location.

In another embodiment of the detection system, the control module is configured to communicate the information responsive to the first signal being indicative of the first sensor detecting use of a handheld wireless device in the operator cab.

In another embodiment of the detection system, the device interface includes a second sensor input for receiving a second signal from a second sensor relating to detecting a second designated condition in the operator cab of the first locomotive. The control module is configured to communicate the information, the information relating to the first signal and the second signal, responsive to the first signal indicating detection of a first occupancy condition of the operator cab by the first sensor and the second signal indicating detection of a different, second occupancy condition of the operator cab by the second sensor.

Another embodiment relates to a detection system. The system comprises a control module configured to be operably coupled on board a rail vehicle. The control module comprising a device interface. The device interface includes a sensor input for receiving a signal from a sensor. The control module is further configured, responsive to the signal indicating use of a hand-held wireless communication device in the rail vehicle, to at least one of: store information relating to the signal on board the rail vehicle; communicate the information to an off-board recipient; or activate a device to prevent the wireless communications.

In another embodiment of the detection system, the control module is configured to store the information, communicate the information, or activate the device responsive to the signal indicating use of the hand-held wireless communication device in an area of the rail vehicle where using hand-held wireless devices for wireless communications is prohibited. The rail vehicle comprises a locomotive and the area comprises an operator cab of the locomotive.

In another embodiment of the detection system, the information relating to the signal comprises at least one of a time of day when the wireless communication device was used or a duration of how long the wireless communication device was used.

Another embodiment relates to a detection method. The method comprises receiving a first output from a first sensor on board the first rail vehicle, receiving a second output from a second sensor on board the first rail vehicle, and communicating an occupancy status determined based on the first output and the second output, or communicating information of the first output and the second output. The occupancy status or information is communicated off-board the first rail vehicle.

In another embodiment of the method, the occupancy status or information is communicated to a second rail vehicle.

In another embodiment of the method, the occupancy status or the information is communicated to the second rail vehicle over a communication link of a distributed power system of the first and second rail vehicles.

In another embodiment of the method, the method further comprises determining the occupancy status as indicative of intruder entry into the first rail vehicle if the first output is indicative of an entry of the first rail vehicle being opened and if the second output is indicative of a living being present in an interior of the first rail vehicle.

In another embodiment of the method, the first output is received from an entry ajar sensor, and the second output is received from one of a motion detection sensor in an interior of the rail vehicle, a heat sensor in the interior, an operator control usage sensor in the interior, a gas constituent sensor in the interior, or a pressure sensor in the interior.

Another embodiment relates to a detection method. The method comprises automatically alerting an operator on board a second rail vehicle of intruder entry into a first rail vehicle if a first output of a first sensor on board the first rail vehicle is indicative of an entry of the first rail vehicle being opened and if a second output of a second sensor on board the first rail vehicle is indicative of a living being present in an interior of the first rail vehicle.

In another embodiment of the method, the operator is alerted only if the first output and the second output occur within a designated time threshold of one another.

In another embodiment of the method, the method further comprises, subsequent to alerting the operator, generating a control signal for initiating deployment of a killer robot in the interior of the first rail vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

The invention claimed is:

1. A detection system, comprising:
a control module configured to be operably coupled on board a first rail vehicle, the control module comprising a device interface;
wherein the device interface includes a first sensor input for receiving a first signal from a first sensor relating to a first occupancy condition of the first rail vehicle;
wherein the device interface includes a second sensor input for receiving a second signal from a second sensor relating to a second occupancy condition of the first rail vehicle;
wherein the control module is configured to at least one of: determine an occupancy status of the first rail vehicle based on the first and second signals, or communicate information of the first and second signals for determination of the occupancy status of the first rail vehicle;
wherein the control module is configured to at least one of: communicate the occupancy status to a second rail vehicle over a communication channel of a distributed power system of the first and second rail vehicles; or communicate the information of the first and second signals to the second rail vehicle over the communication channel of the distributed power system, for determination of the occupancy status of the first rail vehicle at the second rail vehicle; and
wherein the control module is configured to communicate a single bit incorporating the first signal and the second signal reporting the occupancy status of the first rail vehicle to the second rail vehicle.

2. The detection system of claim 1, wherein the control module is configured to receive a third signal indicative of unmanned operation of the first rail vehicle, and to enter a mode of operation of the control module for determining the occupancy status or communicating the information responsive to the third signal.

3. The detection system of claim 1, wherein the control module is configured to communicate the occupancy status or the information responsive to the first signal indicating detection of an entryway of the first rail vehicle having been opened and the second signal indicating detection of a living being present in an interior of the first rail vehicle.

4. The detection system of claim 1, wherein: the control module is configured for operable coupling with an operator interface in the first rail vehicle; the control module is configured to detect a use of the operator interface that meets one or more designated criteria; and the control module is further configured to determine the occupancy status or communicate the information based on the use.

5. The detection system of claim 1, wherein the control module is configured, responsive to receiving the first and second signals, to generate a control signal for activating a camera in an interior of the first rail vehicle, and to receive picture information from the camera.

6. The detection system of claim 1, wherein: the control module is configured for operable coupling with an operator interface in the first rail vehicle; and the control module is configured to disable the operator interface responsive to the occupancy status.

7. The detection system of claim 1, wherein the distributed power system is configured for the second rail vehicle to control the first rail vehicle when the first rail vehicle is unmanned.

8. A detection system, comprising:
a control module on board a first rail vehicle, the control module comprising a device interface;
a first sensor connected to the device interface and configured to generate a first signal relating to a first occupancy condition of the first rail vehicle; and
a second sensor connected to the device interface and configured to generate a second signal relating to a second occupancy condition of the first rail vehicle;
wherein the control module is configured to receive the first and second signals and to at least one of:
determine an occupancy status of the first rail vehicle based on the first and second signals and communicate the occupancy status to a second rail vehicle over a communication link of a distributed power system of the first and second rail vehicles, or
communicate information of the first and second signals to the second rail vehicle over the communication link of the distributed power system for determination of the occupancy status of the first rail vehicle at the second rail vehicle; and
wherein the control module is configured to communicate a single bit incorporating the first signal and the second signal reporting the occupancy status of the first rail vehicle to the second rail vehicle.

9. The detection system of claim 8, wherein the first sensor is configured to generate the first signal responsive to an entryway of the first rail vehicle being opened, and wherein the second sensor is configured to generate the second signal responsive to detecting presence of a living being in an interior of the first rail vehicle.

10. The detection system of claim 9, wherein the first sensor is an entry ajar sensor operatively coupled to the entryway of the first rail vehicle, and the second sensor is one of a motion detection sensor in an interior of the first rail vehicle, a heat sensor in the interior, an operator control usage sensor in the interior, a gas constituent sensor in the interior, or a pressure sensor in the interior.

11. The detection system of claim 8 further comprising:
a camera operably coupled to the control module and configured to capture picture information of an interior of the first rail vehicle;
wherein the control module is configured to activate the camera to capture the picture information based on the occupancy status.

12. The detection system of claim 11, wherein at least one of the camera or the control module is configured to store the picture information and to time stamp the picture information.

13. The detection system of claim 12, wherein said at least one of the camera or the control module is configured to control redundantly storing the picture information on a rail vehicle event recorder.

14. The detection system of claim 8, wherein the control module is configured to disable an operator interface of the first rail vehicle responsive to the occupancy status.

15. The detection system of claim 8, wherein the control module is configured to enter a mode of operation of the control module for determining the occupancy or communicating the information responsive to the first rail vehicle being controlled for unmanned operation.

16. The detection system of claim 8, wherein the distributed power system is configured for the second rail vehicle to control the first rail vehicle when the first rail vehicle is unmanned.

* * * * *